(12) United States Patent
Perkal et al.

(10) Patent No.: US 11,860,998 B2
(45) Date of Patent: Jan. 2, 2024

(54) EMULATOR DETECTION THROUGH USER INTERACTIONS

(71) Applicant: PAYPAL, INC., San Jose, CA (US)

(72) Inventors: Yotam Perkal, San Jose, CA (US); Yuri Shafet, San Jose, CA (US); Eli Straznik, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 190 days.

(21) Appl. No.: 17/461,156

(22) Filed: Aug. 30, 2021

(65) Prior Publication Data

US 2021/0390177 A1    Dec. 16, 2021

Related U.S. Application Data

(63) Continuation of application No. 16/233,839, filed on Dec. 27, 2018, now Pat. No. 11,106,786.

(51) Int. Cl.
*G06F 21/54* (2013.01)
*G06F 21/55* (2013.01)
*G06F 3/0485* (2022.01)
*G06F 3/0488* (2022.01)

(52) U.S. Cl.
CPC ............ *G06F 21/54* (2013.01); *G06F 3/0485* (2013.01); *G06F 3/0488* (2013.01); *G06F 21/554* (2013.01); *G06F 2221/034* (2013.01)

(58) Field of Classification Search
CPC ...... G06F 21/54; G06F 3/0485; G06F 3/0488; G06F 21/554
See application file for complete search history.

(56) References Cited

U.S. PATENT DOCUMENTS

| | | |
|---|---|---|
| 2015/0205944 A1 | 7/2015 | Turgeman |
| 2015/0256528 A1 | 9/2015 | Turgeman |
| 2015/0338942 A1 | 11/2015 | Stone |
| 2016/0191338 A1 | 6/2016 | Sankaranarasimhan et al. |
| 2017/0024073 A1 | 1/2017 | Schwarz et al. |
| 2017/0195356 A1* | 7/2017 | Turgeman ............... H04L 63/08 |
| 2018/0095596 A1* | 4/2018 | Turgeman ............. G06F 3/0346 |

* cited by examiner

*Primary Examiner* — Oleg Korsak
(74) *Attorney, Agent, or Firm* — Haynes and Boone, LLP

(57) ABSTRACT

Methods and systems are provided to determine when a first electronic device is emulating a second electronic device. The first electronic device may be operated through indirect inputs such as through a mouse and keyboard. The second electronic device may be operated through direct inputs such as inputs received through a touchscreen. Interaction data received from the first electronic device may be used to determine that the first electronic device is operating an emulator. Interaction data may include data associated with scrolling on the electronic device and such data may allow a determination that the electronic device received indirect inputs and, thus, is operating an emulator.

20 Claims, 5 Drawing Sheets

EMULATOR DETECTION THROUGH USER INTERACTIONS

CROSS REFERENCE TO RELATED APPLICATIONS

The present application claims priority to U.S. application Ser. No. 16/233,839 filed Dec. 27, 2018 and which is incorporated by reference in its entirety.

BACKGROUND

Field of the Invention

The present invention generally relates to electronic fraud detection, and more particularly to detection of emulators used to simulate other electronic devices.

Related Art

As electronic transactions are increasingly conducted through electronic devices such as mobile devices, malicious actors are using electronic device emulators to conduct fraud with stolen accounts. Such emulators allow malicious actors to imitate a victim's electronic device and, accordingly, fool anti-fraud mechanisms. Typically, configuration based indicators (e.g., SIM configurations, hardware configurations, hardware identification numbers, root access, and other indicators) are used to detect when an emulator is used. However, as emulator abilities improve, such emulators may imitate almost all parameters of electronic devices. Thus, detection of when an emulator is used becomes increasingly difficult.

Figure 1:
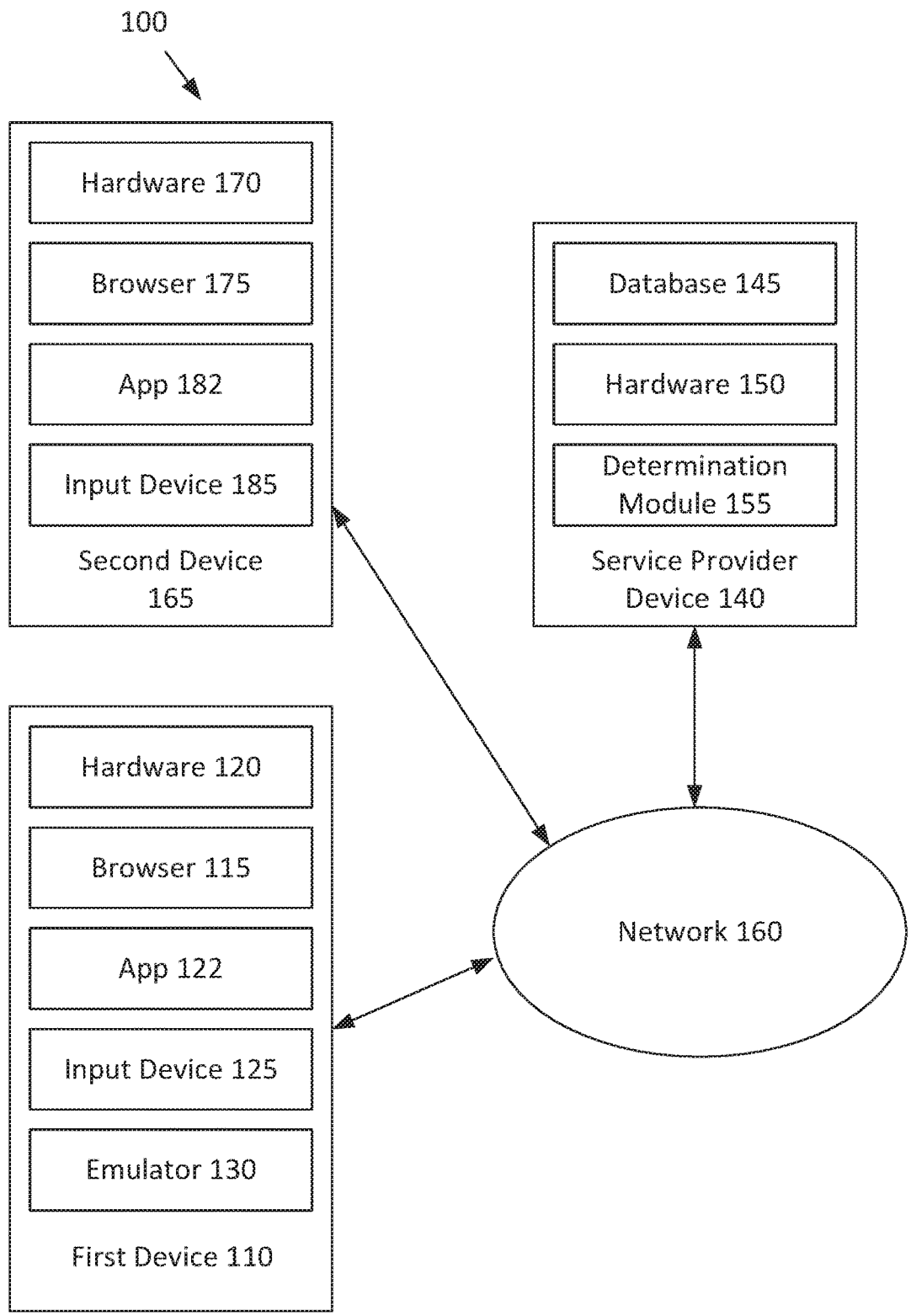
FIG. 1 is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow detection of when a first electronic device is using an emulator to imitate another electronic device. For example, data related to user interactions with the first electronic device may be analyzed and the use of the emulator may be determined from such data. Such data may be metadata related to user interactions such as clicking, scrolling, or other user interactions with a user interface of the electronic device. For example, a mobile device is typically scrolled and controlled through a touchscreen. By contrast, an electronic device operating an emulator to pose as a mobile device may be controlled by a keyboard and mouse. Thus, scrolling on the mobile device may be operated through touch and the metadata may indicate varying touch forces and radius. By contrast, scrolling on the electronic device operating the emulator may be through keyboard and mouse and the metadata may include that scrolling is operating through clicking on a scroll bar, scrolling a mouse wheel, or through a keyboard interaction such as pressing a "Tab" key or another key. The metadata of such inputs may differ from the metadata that typically indicates scrolling through touch. Furthermore, typing on a virtual keyboard of a mobile device may produce metadata characteristics different from that of typing on an actual keyboard (e.g., typing speeds, the presence and use of auto-correct, and/or pauses between different sets of keyboards, such as between letters and numbers, may indicate use of the virtual keyboard or an actual keyboard). Such interactions may provide a reliable indicator of the type, configuration, and/or specific identity of the electronic device. The metadata may allow a determination that the user interactions are indicative of actual user interactions with the first electronic device and not of emulator actions imitating user interactions. Such metadata may include data associated with one of more characteristics determined from clicking, scrolling, or other user interactions. Accordingly, a determination may then be made that the first electronic device is emulating the other electronic device. The determination that the first electronic device is emulating the other electronic device may aid in preventing fraudulent electronic transactions and improve online security and fraud detection.

Additionally, in certain embodiments, models may be built from, for example, historical data that would indicate the use of an emulator. A system may compare metadata to the model to determine whether the metadata substantially corresponds to such models (e.g., movement models of a mouse). If the metadata corresponds to the models, the system may determine that the emulator operation is likely.

FIG. 1 is a schematic diagram showing a system according to an embodiment of the disclosure. Networked system 100 may include or implement one or more electronic devices such as mobile devices, desktop computers, servers, and/or software components that operate to perform various transactions or processes. It can be appreciated that system 100 illustrated in FIG. 1 may be deployed in other ways and that the operations performed and/or the services provided by the electronic devices described herein may be combined or separated for a given implementation and may be performed by a greater number or fewer number of devices.

System 100 may include a first device 110, a determination device 140, and a second device 165. The devices of system 100 may communicate with one or more other devices over network 160. Determination device 140 may be maintained by a payment provider or other transaction processing entity. In certain embodiments, determination device 140 may be integrated into one or more servers. Such servers may additionally be configured to perform other operations, such as payment or transaction processing. Thus, determination device 140 may be maintained by a payment service provider, such as PayPal, Inc. of San Jose, CA. Such servers may also include one or more databases storing data (e.g., historical transactions or device data) related to one or more devices (e.g., second device 165). Such data may aid in the determination of the identity of devices communicating with determination device 140. For example, determination device 140 may include one or more models that corresponds to operation of an emulator. The models may be built from, for example, historical data. Determination device 140 may compare metadata to the model to determine whether the metadata substantially corresponds to such models (e.g., movement models of a mouse). If the metadata corresponds to the models, the determination model 140 may determine that the emulator operation is likely.

A user may utilize first device 110 to communicate with a service or transaction provider controlling determination device 140. The user may utilize first device 110 to initiate an electronic transaction, request information, conduct a transaction, or interact with the service provider in another manner. "Transaction," as used herein, refers to any suitable action performed using electronic devices, including product or service purchases, payments, transfer of information, display of information, etc.

First device 110, determination device 140, and second device 165 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet and/or one or more intranets, landline networks, wireless networks, and/or other appropriate types of networks.

First device 110 may be implemented using any appropriate hardware and software configured for wired and/or wireless communication over network 160. For example, in one embodiment, first device 110 may be implemented as a personal computer (PC), a smart phone, laptop computer, a tablet, a wearable computing device, and/or other types of computing devices that includes hardware 120 capable of receiving user inputs and transmitting and/or receiving data. Hardware 120 may include components to operate one or more user interfaces (e.g., touch screens, a mouse, a keyboard, and other input device) as well as processors, memory, screens, speakers, and other hardware devices that can be used to operate first device 110.

First device 110 may additionally include an emulator 130. Emulator 130 may be a hardware and/or software based emulator. Thus, emulator 130 may be, for example, a program operated on first device 110 separately or concurrently with one or more other programs. In certain embodiments, emulator 130 may allow first device 110 to imitate another device. For example, emulator 130 may allow first device 110, when interacting with one or more other devices such as service provider device 140, to provide data identifying first device 110 as another device. Such data may identify first device 110 as a device with different hardware, different operating system, or utilizing different software from what first device 110 actually possesses.

In certain embodiments, first device 110 may include one or more user identifiers which may be implemented, for example, as operating system registry entries, cookies associated with browser application 115, identifiers associated with hardware of first device 110, or other appropriate identifiers, such as used for payment/user/device authentication. In one embodiment, such a user identifier may be used by a payment service provider to associate with a particular account maintained by the payment provider. Emulator 130 may be configured to modify or change such user identifiers. For example, first device 110 may be a device with processor A and memory amount X. Emulator 130 may disguise first device 110 as a device with processor B and/or memory amount Y. Additionally, emulator 130 may disguise first device 110 as utilizing an operating system different than what first device 110 is actually operating. Accordingly, emulator 130 may allow for first device 110 to, for example, pose as second device 165 using characteristics of and for identifying second device 165.

Emulator 130 may be used in a manner to allow a first user of first device 110 to fraudulently obtain account information belonging to a second user of second device 165. In certain embodiments, service provider device 140 may be configured to detect possible fraudulent transactions by matching identification data of devices known to belong to the second user to that provided by the electronic device service provider device 140 is interacting with. If the identification data does not match, service provider device 140 may then accordingly flag a log-in process, new user registration, or a transaction as possibly fraudulent. Such identification data may include configuration based indicators (e.g., SIM configuration, hardware configurations, hardware identification numbers, root access, and other indicators). Emulator 130 may be used to match such identification data to deceive service provider device 140.

For example, the first user may be in possession of a variety of stolen accounts. Such accounts may typically be accessed through different types of computing devices, including mobile computing devices. For example, first device 110 may be an electronic device such as a desktop computer operating emulator 130 attempting to emulate a mobile computing device. Emulator 130 may then allow first device 110 to pose as a variety of different mobile devices (e.g., by changing the device that emulator 130 is emulating). Accordingly, the number of accounts that the first user can access (e.g., to verify that the accounts are still operational), as well as the speed at which the accounts are accessed, can be increased. Furthermore, the first user may quickly access such accounts by using a keyboard and mouse to interact with one or more webpages of the service provider associated with service provider device 140. First device 110 may accordingly utilize emulator 130 to disguise first device 110 as the known electronic device of each of the stolen accounts to evade detection.

First device 110 may additionally include one or more browser applications 115 which may be used, for example, to provide an interface for the first user to browse information available over network 160. In one embodiment, browser application 115 may be implemented as a web browser configured to view, access, and/or provide information available over the Internet. In certain embodiments, the first user may operate emulator 130 and browser applications 115 concurrently. Accordingly, emulator 130 may modify data provided from browser applications 115. Such modified data may be provided over network 160 to service provider device 140 to aid in disguising first device 110 as, for example, second device 165.

Browser applications 115 and first device 110 generally may be operated by input received through input device 125. Input device 125 may allow for a user to provide instructions to first device 110. Input device 125 may be one or more of a touchscreen, a mouse, a keyboard, a microphone, an external device coupled to first device 110 (e.g., a joystick), a camera, and/or another such device configured to receive user inputs and/or instructions. In certain embodiments, input device 125 may be another electronic device ("controlling device") that is remotely operating first device 125 (e.g., the another electronic device may be a desktop computer that is controlling a mobile device, or vice versa). In such a configuration, interaction data provided to service provider device 140 may correspond to interactions of the first user with the controlling electronic device. Thus, the techniques described herein may allow service provider device 140 to determine the identity of the controlling device. Other embodiments may also allow service provider device 140 to determine the identity of the first device 125 operated by the controlling device.

First device 110 may further include other applications 122 to perform other functions or provide other features for first device 110. For example, other applications 122 may include security applications for implementing client-side security features, programmatic client applications for interfacing with appropriate application programming interfaces (APIs) over network 160, or other types of applications. Applications 122 may also include applications that enable the user to communicate, transfer information, make payments, and otherwise conduct transactions through the service provider as discussed above.

Service provider device 140 may be maintained, for example, by a merchant or service provider offering various products and/or services (e.g., transaction or payment processing services). Service provider device 140 may include hardware 150, which may be similar to hardware 120 of first device 110 and configured to allow operation (e.g., by providing processing resources, cooling, and/or other performing other operations) of service provider device 140.

Service provider device 140 may also include a database 145 that stores data associated with transactions, accounts, and/or users associated with the service provider. In certain embodiments, the accounts may be user accounts maintained by the service provider. Such accounts may typically be accessed through electronic devices of the users. Database 145 may further include data associated with such electronic devices, such as data identifying the make, model, hardware and/or software configuration, and/or specific serial number of electronic devices that are determined to be associated with each user. Accordingly, database 145 may store data identifying hardware and/or software configurations of the electronic devices. Such data may be used to determine if any instance of user account access may be potentially fraudulent. Potentially fraudulent transactions may accordingly be flagged and further action may be taken to verify the transaction, lock or cancel the action, or otherwise confirm the identity of the user to prevent fraud.

Service provider device 140 may also include a determination module 155. In various embodiments, determination module 155 may be implemented as hardware, software, or a combination thereof. For example, determination module 155 may be a computer implemented program. In various embodiments, determination module 155 may receive data from hardware and/or software of service provider device 140. From such data, determination module 155 may receive data provided by an electronic device from communications circuitry of service provider device 140 and may then determine whether the electronic device is operating an emulator.

Second device 165 may be operated by a second user. The second user may be associated with an account that the first user has fraudulently obtained. Second device 165 may include similar components (e.g., hardware 170, browser 175, applications 182, and input device 185) to that of first device 110. Such components may include the features described for corresponding components of first device 110. However, second device 165 may not include an emulator as the second user is not trying to fraudulently access accounts of other users.

Figure 2:
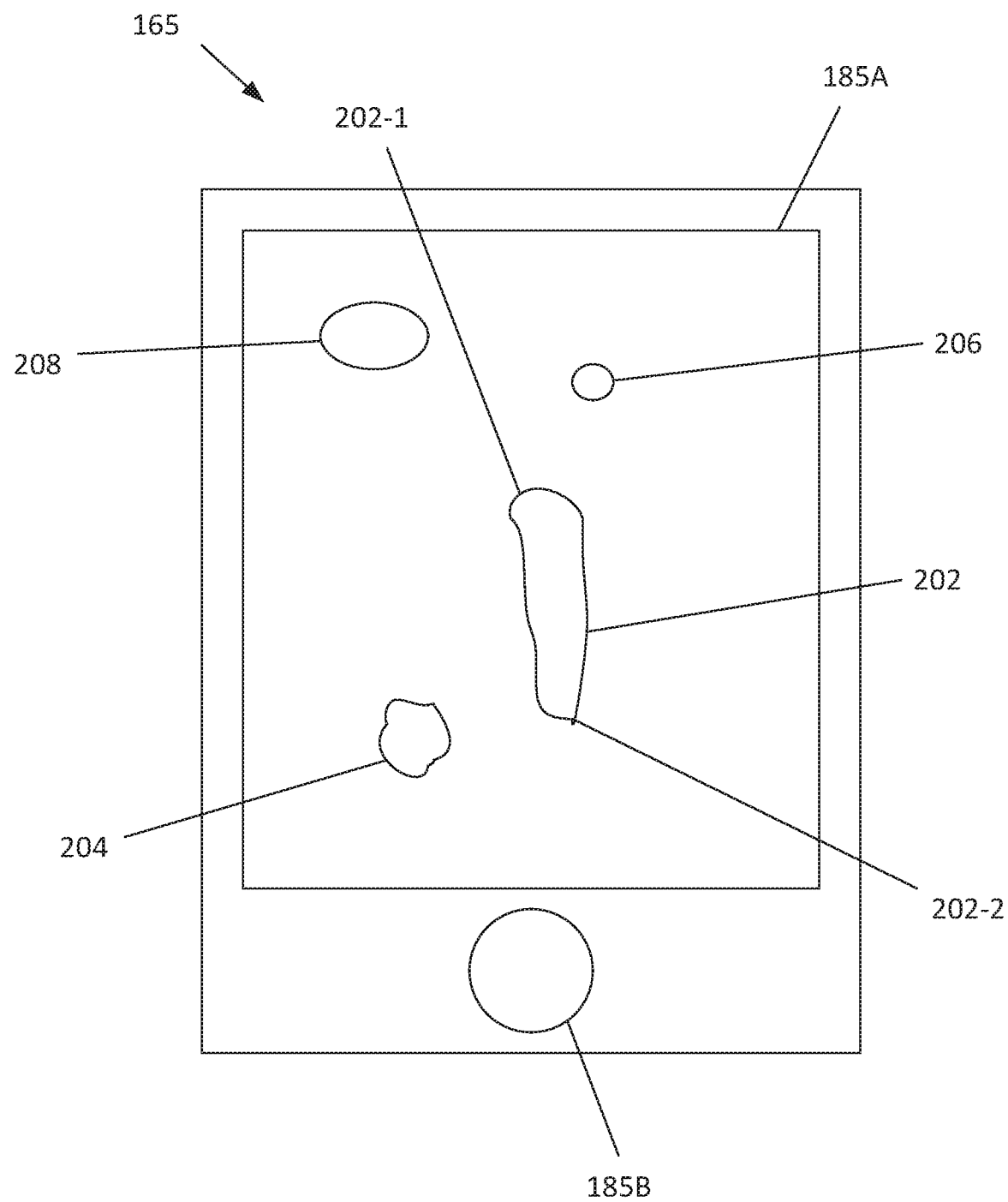
FIG. 2 is a schematic representation of various user interactions with a mobile electronic device according to embodiments of the disclosure.

FIG. 2 is a schematic representation of various user interactions with a mobile electronic device according to embodiments of the disclosure. FIG. 2 illustrates examples of user inputs provided to second device 165. In various embodiments, second device 165 may be a mobile device such as a smartphone, tablet, or other such electronic device. Second device 165 may include input devices 185A and 185B. Input device 185A may be a touchscreen or other device that receives direct input from the user while input device 185B may be a button. For the purposes of this disclosure, direct input may be, for example, input received through a touchscreen, where input from a user is received and converted to a control input. Indirect input may be, for example, input received from a mouse, where movement of a user is converted to movement of a device before the control input is received by the electronic device.

As shown, a user (e.g., the second user) may interact with input device 185A through a variety of different ways. Such an interaction may be used to access or provide instructions to an account of the user (e.g., an account maintained by the service provider). The instructions may be provided along with metadata related to the input received from the user. Such metadata may include, for example, touch radius, touch force, scrolling direction, scrolling velocity/acceleration, input lag (e.g., certain devices may require a sustained amount of input before the electronic device reacts), and other such information associated with the input.

The metadata may provide information related to the direct input. Such metadata may be used by the service provider to determine whether the device is operating or receiving input from an emulator. For example, direct input received from a touchscreen may include certain characteristics that may be determined from the metadata. Such characteristics may be different from instructions received through indirect inputs.

For example, input 202 may be an example of a scrolling input or other type of input that requires a user to move his or her finger over a portion of input device 185A. As such, the user may initially place his or her finger at input region 202-1 and move the finger to input region 202-2. During movement of the finger, the touch radius and/or force detection by input device 185A may be uneven. That is, as shown, in certain portions of input 202, the user may input a higher amount of force and/or have a larger touch radius than in other portions. For example, input region 202-1 may experience a higher amount of touch force and/or larger touch radius than input region 202-2. Such differences may be inherent in touchscreen scrolling where inputs are received directly from a human. Metadata provided by second device 165 may allow determination of such differences, or lack thereof in the cases of devices operated through indirect input.

Furthermore, input 202 may include variances in the direction of scrolling along its length. Such variances may be different in direct inputs than in indirect inputs (e.g., direct inputs may include minor variations along the length of input 202 that is not inherent in indirect inputs). Additionally, input device 185A may allow for scrolling where a swipe provided by input 202 may continue to scroll information presented on input device 185A after input 202 has been received. The speed, acceleration, and/or duration of such continued scrolling may be controlled through the speed, acceleration, or force of input 202. The speed and/or duration of such continued scrolling may vary between different models of electronic devices. Such data (e.g., speed or force of input 202 and resulting amount of scrolling of information presented on input device 185A) may additionally be communicated through metadata.

Input 204 may be an example of a touch input. As input 204 may be received on a touchscreen, the touch radius of input 204 may be uneven. That is, the touch radius of input 204 may vary between portions of input 204 (e.g., may be not be perfectly round). Additionally, the touch force of input 204 may also vary between different portions of input 204. The variances between different portions of input 204 may be communicated through metadata provided and may allow for a determination that input 204 was received through a direct input.

Inputs 206 and 208 may be additional examples of touch inputs. The force and/or touch radius of inputs 206 and 208 may be different. Input 206 may be a light input with a small amount of force and may be substantially circular in touch radius (suggesting a frontal tap). Input 208, by contrast, may be a heavier input with a larger amount of force and may be different in shape than input 206 (e.g., an oval shaped touch, suggesting a sideways touch). Such variations are common in direct inputs as human inputs are not entirely consistent, but are not present in indirect inputs (e.g., indirect inputs do not have different input directions). In various embodiments, the inputs may generically distinguish between human inputs and machine-emulated inputs, but may also or alternatively distinguish based on specific user inputs. For example, one user may user a specific force, speed, acceleration scrolling, touch radius, and/or a touch pattern that may be unique to the user and enable a determination that the action on the computing device is being performed through an emulator than the specific user associated with the device and/or account.

Additionally, in certain embodiments, inputs 206 and 208 may be received concurrently. That is, a user may interact with second device 165 by, for example, placing two fingers on input device 185A. The two fingers may result in substantially or partially simultaneous inputs 206 and 208. A plurality of simultaneous inputs may be a typical technique of controlling a user interface of a mobile device (e.g., through a touchscreen of a tablet or smart phone), but may not be possible for an electronic device controlled through keyboard, mouse, touchpad, or other components typical of a desktop or laptop computer. Indeed, many scrolling or zooming features of touchscreens are controlled through a plurality of simultaneous inputs. Metadata communicated from such electronic devices or generated by monitoring such electronic devices (e.g., through their interactions with the service provider) may include data indicating such simultaneous inputs. Such inputs may be provided to interact with a program (e.g., app) or webpage of the service provider.

Figure 3:
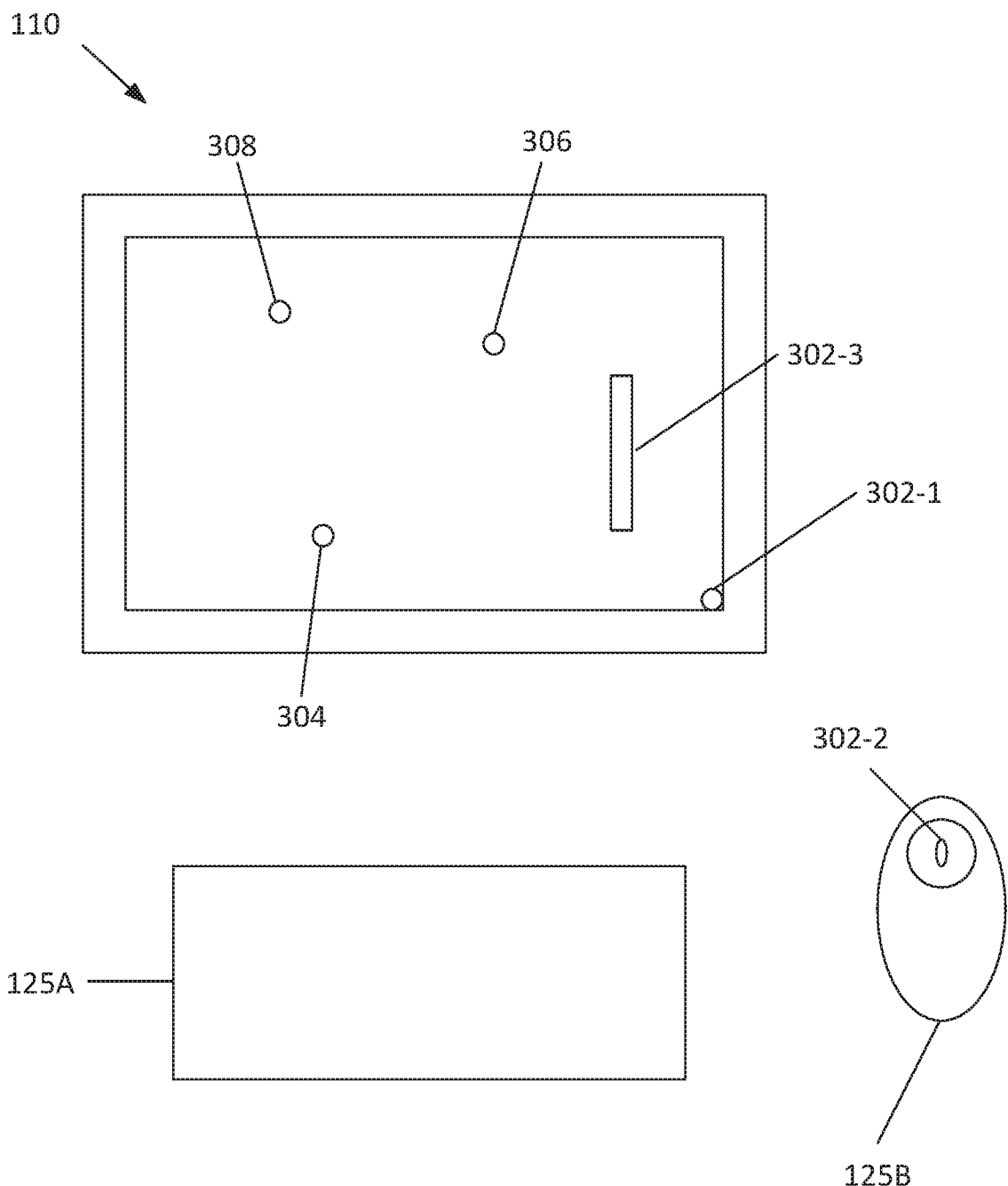
FIG. 3 is a schematic representation of various interactions with an electronic device operating an emulator according to embodiments of the disclosure.

FIG. 3 is a schematic representation of various interactions with an electronic device operating an emulator according to embodiments of the disclosure. FIG. 3 illustrates examples of user inputs provided to first device 110. In various embodiments, first device 110 may be an electronic device such as a desktop computer, laptop computer, mobile computing device, or other such electronic device. In certain embodiments, first device 110 may include input devices 125A and 125B. Input device 125A may be a keyboard while input device 125B may be a mouse. Input devices 125A and 125B may be indirect input devices where movement of a user is converted to movement of a device before the control input is received by the electronic device.

In various embodiments, first device 110 may, alternatively or additionally, include other input devices.

As described herein, first device 110 may operate emulator 130. Emulator 130 may be operated by a first user to attempt to disguise first device 110 as second device 165. The first user may attempt to interact with a service provider to access or provide instructions to an account (that may be maintained by the service provider) of the second user. The first device 110, when interacting with the service provider, may provide metadata related to the input received from the first user along with other instructions. Such metadata may indicate that, although emulator 130 is attempting to disguise first device 110 as second device 165, first device 110 is receiving indirect inputs from the first user. The service provider may also determine that second device 165 should be receiving direct inputs. Due to such a determination, the service provider may then determine that the device it is interacting with is a device operating an emulator, which may indicate a greater chance of fraud.

As described, inputs 302 to 308 may correspond to inputs 202 to 208 described in FIG. 2, but may be indirect inputs received from input devices 125A and/or 125B instead of the direct inputs described in FIG. 2. For example, inputs 302-1 to 302-3 may be examples of scrolling inputs received from the first user. As the first user is using input devices 125A and/or 125B to provide such inputs, the first user may scroll by clicking on a scroll bar, as shown by input 302-1, or scroll through a mouse wheel via input 302-2. Furthermore, the first user may press the "Tab" key to jump between forms on a website. Such inputs are instantaneous inputs and, for inputs such as pressing the "Tab" key or scrolling through the mouse wheel, also involves moving between portions of the display (e.g., fields for entering of information or moving the content displayed) without moving the cursor (which may be controlled by the input device 125B or through a touchscreen), an action that is typically not performed on a mobile device or unable to be performed on a mobile device. Furthermore, emulator 130 may attempt to recreate the scrolling motion typical of mobile devices by allowing for click and drag scrolling, as shown by input 302-3. However, such click and drag scrolling may include a zero value or constant value touch force or touch radius. Additionally, the input direction of input 302-3 may be unvarying, in contrast to a direct input.

Also, typing on a virtual keyboard of a mobile device may produce metadata indicating characteristics different from that of typing on an actual keyboard. For example, the metadata may indicate typing speeds, the presence and/or use of auto-correct, and/or pauses between different sets of keyboards. Quick typing speeds may be a factor indicating use of input device 125A while slower typing speeds may be a factor indicating use of a virtual keyboard. Such factors may be combined with other factors such as the use or frequency of auto-correct (typically, the use or higher occurrences of auto-correct may indicate an actual mobile device) and/or pauses between different sets of keyboards (e.g., virtual keyboards of mobile devices may typically include pauses between when letters and numbers are typed as the user is required to switch between different sets of keyboards). In certain embodiments, multiple factors may be detected and the use of an emulator may be determined through some or all such factors. Thus, for example, a weighted formula utilizing input from different types of metadata indicating different detected conditions may be used to determine whether emulator use is likely or not.

By contrast, in FIG. 2, the second user may scroll through input 202, which is provided through a period of time instead of instantaneously as in inputs 302-1 and 302-2. Furthermore, inputs 302-1 to 302-3 may not include or may only have a minimal (e.g., one pixel) touch radius, in contrast to the multiple pixel and changing touch radius of input 202. Furthermore, inputs 302-1 to 302-3 may not include a touch force value or may include consistent touch force values (e.g., may register a fixed value). Such differences between input 202 and inputs 302-1 to 302-3 may be determined from metadata provided by electronic devices and may be used to determine if first device 110 is operating emulator 130 or is otherwise a different model or type of device from that of second device 165.

Inputs 304 to 308 may be examples of click inputs. In contrast to inputs 204 to 208, which are examples of touch inputs and illustrate uneven and/or varying touch radius, force, and/or duration, inputs 304 to 308 are inputs with consistent (either zero or non-zero) touch radius, force, and/or duration. Such consistent indicators allow for a determination that the inputs received are indirect inputs received from an input device such as a mouse or keyboard.

Furthermore, in certain embodiments, inputs 306 and 308 may be provided via a mouse (e.g., input device 125B). Thus, where inputs 206 and 208 may be received concurrently, inputs 306 and 308 may not be received simultaneously due to the nature of input device 125B. The lack of simultaneous inputs may indicate indirect inputs and, thus, result in a determination that first device 110 is operating emulator 130. For example, certain functions of an electronic device that includes a touchscreen (e.g., a tablet or mobile device) may generally be controlled through a plurality of simultaneous inputs. The nature of such control inputs may be inherent to, for example, the program, application, or operating system of such an electronic device. If service provider device 140 (e.g., through determination module 155 using metadata received) determines that such functions are instead being controlled through non-simultaneous inputs, or through inputs that are different in nature than expected, a determination may be made that first device 110 is operating emulator 130.

Touchscreens of mobile devices may be of different sizes. As such, the touchscreens may sense force from a plurality of sectors (e.g., sectors correlated to pixel locations). As the touchscreens may be different sizes, different electronic devices may include a different number of such sectors. If first device 110 is providing data from a sector that should not exist on the type of mobile device that first device 110 is claiming to be, the service provider may determine that first device is operating emulator 130. Additionally, such sector data may also allow determination of the type of electronic device by, for example, allowing for determination of the size of the touchscreen.

In certain embodiments, emulator 130 may attempt to emulate the number of sectors of the touchscreen. However, in such emulators, data directed to inputs (e.g., touch radius, touch force, and other input data) may not be properly resized and, thus, for example, operation of emulator 130 may be determined by comparing the input data to what is expected for the size of the touchscreen.

Thus, as shown in FIG. 3, indirect inputs received from, for example, input devices 125A and 125B may include characteristics different from that of direct inputs received from, for example, a touchscreen. Such characteristics may be determined by service provider device 140 from metadata received electronic devices.

Figure 4:
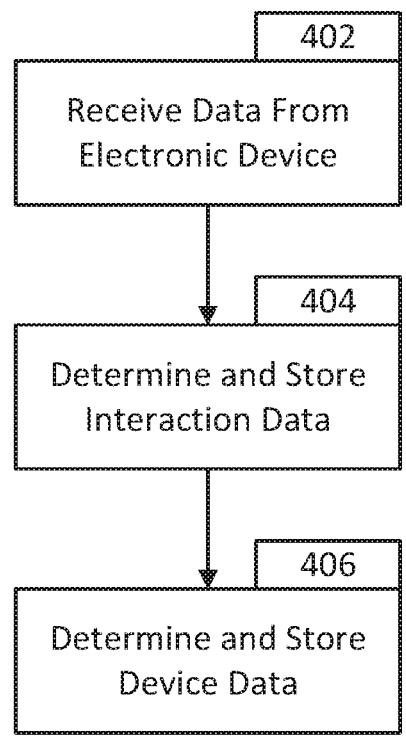
FIG. 4 is a flowchart showing an example of operations performed by an emulator detection process according to an embodiment of the disclosure.

FIG. 4 is a flowchart showing an example of operations performed by an emulator detection process according to an embodiment of the disclosure. FIG. 4 illustrates a portion of a process for determining emulator usage by an electronic device as performed by a service provider.

In block 402, data may be received from an electronic device of an account holder. The account holder may have an account managed or controlled by the service provider (e.g., a customer account, a merchant account, a payment account, a bank account, a loyalty account, and/or another such account). The data provided by the electronic device may include data associated with the user account and/or metadata directed to inputs received by the electronic device.

In block 404, interaction data may be determined and stored from the metadata. Such interaction data may include data associated with inputs received from the user by the electronic device. Such data may accordingly allow the service provider to develop an interaction profile of the user. The profile may include typical touch force, touch radius, variations in touch, force vectors (e.g., whether the user typically swipes up and down, side to side, or diagonally), acceleration rates, and movement speed of the user.

In block 406, device data may be determined and stored. Device data may be data identifying the device identification number, specific model, operating system, and/or programs of the electronic device as well as data associated with characteristics of the specific model, operating system, and/or programs of the electronic device. Accordingly, device data may allow for identification of the specific model or the specific device used by the user. Each user may include associated device data to allow identification of the devices used by the user. The device data may be differentiated between types of devices and, thus, the manner that the user interacts with each device may be determined.

Data related to the characteristics may include, for example, any lag time between inputs and the resulting reaction of the electronic device. That is, certain devices may detect a user input at a first time period, but may not react to the input unless inputs are provided for a threshold time period. Such a reaction may allow for reduced number of false positives due to unintended inputs. By contrast, response to indirect inputs may not include such lag time or may have a much lower lag time. Furthermore, lag times may be different between electronic devices, even different electronic devices that are all operated by direct input. Such differences in lag time may allow for determination of the specific model of the electronic device being operated and, if the models are different, a transaction may be flagged as potentially fraudulent even if direct input is detected.

Additionally, lag times may include, once the electronic device is responding to the input, the lag time between when the input is detected and when the electronic device reacts as well as any non-linearity between reactions to inputs of different accelerations of velocities. Thus, for example, a certain electronic device may react to inputs with velocities of between 0 to X m/s on a 1 to 1 basis (e.g., the interface may scroll the same movement amount as the detected movement) while reacting to inputs with velocities above X m/s on a less or greater than 1 to 1 basis. Such characteristics may differ between electronic devices as well as between devices operated by direct and indirect inputs. Such characteristics may also be determined from metadata and may be inherent to the electronic device, operating system, or program.

Furthermore, data related to the characteristics of electronic devices may include data associated with the input device of the electronic device. For example, different electronic devices may include touchscreens with different inherent characteristics. As such, certain touchscreens may generally register a higher force value in a first region of the touchscreen and a lower force value in a second region of the touchscreen. The service provider may determine such variations from the metadata and, accordingly, determine the specific model or the specific electronic device.

Figure 5:
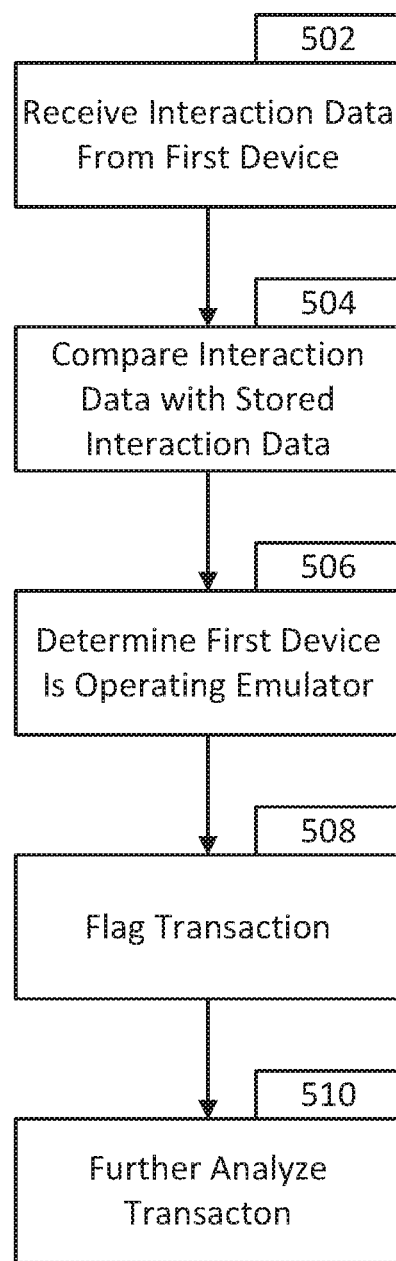
FIG. 5 is a flowchart showing a further example of operations performed by an emulator detection process according to an embodiment of the disclosure.

FIG. 5 is a flowchart showing a further example of operations performed by an emulator detection process according to an embodiment of the disclosure. FIG. 5 may illustrate an example of a process that a service provider may perform to determine if an electronic device that the service provider is receiving data from or interacting with is operating an emulator.

In block 502, interaction data may be received from the electronic device. The interaction data may be data received from the electronic device that is associated with an account (e.g., user log-in, user registration, purchase transaction, payment transaction, account interaction, and/or other transaction associated with the account) and may include metadata associated with user inputs provided to the electronic device.

In block 504, the interaction data received from the electronic device may be compared to stored data. Such stored data may be associated with the account, the specific electronic device, the model of the electronic device or components thereof, the operating system, and/or programs operated by the electronic device. For example, the stored data may be data associated with characteristics inherent to the electronic device or may be data associated with the holder of the account (e.g., data directed to patterns of how the user typically interacts with the electronic device). Accordingly, the stored data may allow the service provider to identify the type of electronic device the interaction data is received from and, thus, whether the electronic device is emulating another device, the type of hardware and/or software systems of the electronic device, and/or the identity of the user operating the electronic device.

Additionally, the stored data may include a model of the emulator to indicate typical inputs and movements when using the emulator and/or metadata received by the metadata. Such models may be compared to received metadata to determine whether the metadata substantially corresponds to such models (e.g., movement models of a mouse when using the emulator).

In block 506, whether the electronic device is operating an emulator may be determined by comparing the interaction data with the stored data. For example, the service provider may determine that the interaction data is indicative of a desktop computer operated through indirect inputs, even though the electronic device is identifying itself as a mobile device operated through direct inputs. Alternatively, the service provider may determine that the electronic device is a first type of mobile device (e.g., a smartphone of a first type), though the electronic device is identifying itself as a second type of mobile device (e.g., a smartphone of a second type). The service provider may make such a determination by, for example, analyzing metadata and concluding that the metadata indicates characteristics of the second type of mobile device. For example, analysis of the metadata may indicate that the touchscreen of the electronic device has a lag time associated with the second type of mobile device.

In certain embodiments, the analysis of metadata may be a rule or statistical model. For example, analysis may be binary so that if one characteristics is lower than or exceeds a threshold (e.g., a minimum touch force), use of an emulator may be assumed. In other examples, various different portions of metadata may be used as an input into a statistical model and if the model returns a value past a threshold, use of an emulator may be likely. In certain such examples, such models may be, for example, similar to a neural network or decision tree fed with metadata related to items such as scrolling speed, acceleration, force, and other factors. Thus, multiple tests, statistical or binary, may be used in the model to determine whether emulator use is likely. In certain embodiments, if one such test indicates that emulator use is likely, the system may determine that an emulator is being used, but other embodiments may require confirmation of multiple tests.

In block 508, upon determination that the electronic device is operating an emulator, the transaction may be flagged as, for example, a suspicious transaction. In certain embodiments, the transaction may be a payment transaction, while in other embodiments the transaction may be a user log-in or a new user registration. The transaction may then be further analyzed in block 510. For example, the service provider may further analyze transaction or interaction data received from the electronic device to further determine the identity of the user and/or electronic device. Additionally, the service provider may contact the user through another known user device or another communication technique (e.g., text messages, voice call, e-mail, or other such technique) to request confirmation of the transaction. Additionally or alternatively, the service provider may cancel the transaction upon determination that the electronic device is operating the emulator.

As such, embodiments of the disclosure provide solutions to problems specific to computers and computer networks, namely, detecting use of a computer device emulator to access restricted content, which improves electronic data security and fraud prevention.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order, hierarchy of steps, or device configuration in the techniques disclosed is an illustration of exemplary approaches. Based upon design preferences, it is understood that the specific order, hierarchy of steps, and/or device configuration in the techniques may be rearranged. Reference to "first," "second," or other numerical identifiers within the disclosure is for identification purposes only unless an explicit hierarchy is referenced.

What is claimed is:

1. A system comprising:
a non-transitory memory; and
one or more hardware processors coupled to the non-transitory memory and configured to read instructions from the non-transitory memory to cause the system to perform operations comprising:
receiving interaction data indicative of a set of touch actions being performed on a first computing device having a first screen size;
analyzing the interaction data;
determining, based on the analyzing, that a set of physical characteristics of the set of touch actions corresponds to characteristics known to be generated by a second computing device having a second screen size different from the first screen size; and
flagging the user account based on the determining that the set of physical characteristics of the set of touch actions corresponds to the characteristics known to be generated by the second computing device having the second screen size.

2. The system of claim 1, wherein the set of physical characteristics of the set of touch actions includes at least one of a touch force, a touch radius, or a movement of a touch.

3. The system of claim 2, wherein the characteristics known to be generated by the second computing device having the second screen size includes at least one of a constancy of the touch force, a constancy of the touch radius, a constancy of a force scrolling, or a zero force scrolling.

4. The system of claim 1, wherein the set of physical characteristics of the set of touch actions includes a lag period between consecutive touch inputs or between consecutive movements of a touch input.

5. The system of claim 4, wherein the characteristics known to be generated by the second computing device having the second screen size includes at least one of a consistency in the lag period or the lag period being shorter than a predefined threshold period.

6. The system of claim 1, wherein the set of physical characteristics of the set of touch actions includes a count of a number of simultaneous touch inputs.

7. The system of claim 6, wherein the characteristics known to be generated by the second computing device having the second screen size includes an absence of the simultaneous touch inputs.

8. The system of claim 1, wherein the interaction data is received as metadata that represents the set of touch actions.

9. A method comprising:
receiving data from a first computing device, wherein the data comprises i) information indicating at least a first screen size of the first computing device and ii) interaction data indicative of a set of touch actions on the first computing device;
analyzing the interaction data to determine a set of physical characteristics of the set of touch actions;
determining, based on the analyzing, that the set of physical characteristics of the set of touch actions corresponds to characteristics known to be generated by a second computing device with a second screen size different from the first screen size; and
flagging the user account based on the determining that the set of physical characteristics of the set of touch actions corresponds to the characteristics known to be generated by the second computing device with the second screen size.

10. The method of claim 9, wherein the interaction data is received as first metadata that represents the set of touch actions, and wherein the characteristics known to be generated by the second computing device with the second screen size are stored as second metadata.

11. The method of claim 10, further comprising:
comparing the first metadata to the second metadata, wherein the determining that the physical characteristics of the set of touch actions corresponds to characteristics known to be generated by the second computing device with the second screen size is further based on the comparing.

12. The method of claim 9, wherein the set of physical characteristics of the set of touch actions includes at least a touch radius.

13. The method of claim 12, wherein the touch radius corresponds to a range of screen sizes.

14. The method of claim 13, further comprising:
determining that the second screen size is outside the range of the screen sizes corresponding to the touch radius, wherein the determining that the set of physical characteristics of the set of touch actions corresponds to the characteristics known to be generated by the second computing device with the second screen size is further based on the determining that the second screen is size is outside the range of the screen sizes.

15. A non-transitory machine-readable medium having stored thereon machine-readable instructions executable to cause a machine to perform operations comprising:
receiving interaction data indicative of a set of touch actions being performed on a first computing device having a first screen size;
analyzing the interaction data;
determining, based on the analyzing, that a set of physical characteristics of the set of touch actions corresponds to characteristics known to be generated by a second computing device having a second screen size; and
flagging the user account based on the determining that the set of physical characteristics of the set of touch actions corresponds to the characteristics known to be generated by the second computing device having the second screen size.

16. The non-transitory machine-readable medium of claim 15, wherein the set of physical characteristics of the set of touch actions includes at least one of a touch force, a touch radius, or a movement of a touch.

17. The non-transitory machine-readable medium of claim 16, wherein the characteristics known to be generated by the second computing device having the second screen size includes at least one of a constancy of the touch force, a constancy of the touch radius, a constancy of a force scrolling, or a zero force scrolling.

18. The non-transitory machine-readable medium of claim 15, wherein the set of physical characteristics of the set of touch actions includes a lag period between consecutive touch inputs or between consecutive movements of a touch input, and wherein the characteristics known to be generated by the second computing device having the second screen size includes at least one of a consistency in the lag period or the lag period being shorter than a predefined threshold period.

19. The non-transitory machine-readable medium of claim 15, wherein the set of physical characteristics of the set of touch actions includes a count of a number of simultaneous touch inputs, and wherein the characteristics known to be generated by the second computing device having the second screen size includes an absence of simultaneous touch inputs.

20. The system of claim 1, wherein the interaction data is received as metadata that represents the set of touch actions.

* * * * *